US008676928B1

United States Patent
Shah

(10) Patent No.: US 8,676,928 B1
(45) Date of Patent: Mar. 18, 2014

(54) METHOD AND SYSTEM FOR WRITING NETWORK DATA

(75) Inventor: Shishir Shah, Irvine, CA (US)

(73) Assignee: QLOGIC, Corporation, Aliso Viejo, CA (US)

( * ) Notice: Subject to any disclaimer, the term of this patent is extended or adjusted under 35 U.S.C. 154(b) by 89 days.

(21) Appl. No.: 13/241,012

(22) Filed: Sep. 22, 2011

Related U.S. Application Data

(63) Continuation of application No. 11/555,180, filed on Oct. 31, 2006, now Pat. No. 8,055,726.

(51) Int. Cl.
*G06F 15/16* (2006.01)
*G06F 15/167* (2006.01)

(52) U.S. Cl.
USPC .............. 709/217; 709/229; 709/212

(58) Field of Classification Search
USPC .................................. 709/217, 229
See application file for complete search history.

(56) References Cited

U.S. PATENT DOCUMENTS

| 5,991,813 | A | 11/1999 | Zarrow |  |
|---|---|---|---|---|
| 6,400,730 | B1 * | 6/2002 | Latif et al. | 370/466 |
| 6,965,934 | B1 * | 11/2005 | Reynolds et al. | 709/224 |
| 7,594,024 | B2 * | 9/2009 | Shah et al. | 709/232 |
| 2003/0037127 | A1 * | 2/2003 | Shah et al. | 709/220 |
| 2003/0126282 | A1 * | 7/2003 | Sarkar et al. | 709/237 |
| 2005/0094619 | A1 | 5/2005 | Ho et al. |  |
| 2005/0117522 | A1 * | 6/2005 | Basavaiah et al. | 370/252 |
| 2006/0235901 | A1 * | 10/2006 | Chan | 707/201 |
| 2007/0239944 | A1 * | 10/2007 | Rupanagunta et al. | 711/147 |

OTHER PUBLICATIONS

"Office Action from USPTO dated Mar. 25, 2009 for U.S. Appl. No. 11/555,180".
"Final Office Action from USPTO dated Nov. 13, 2009 for U.S. Appl. No. 11/555,180".
"Notice of Allowance from USPTO dated Sep. 22, 2011 for U.S. Appl. No. 11/555,180".

* cited by examiner

*Primary Examiner* — Karen Tang
(74) *Attorney, Agent, or Firm* — Klein, O'Neill & Singh, LLP

(57) ABSTRACT

Method and system for writing data in a network is provided. The method includes receiving an original write command from a host system to write data to a target; sending a command notifying the host system to send data, wherein a local router sends the command to the host system; receiving data from the host system, wherein the local router receives data; segmenting the original write command into a plurality of write commands; sending the plurality of write commands with data to a remote router; sending a status command to the local router for the plurality of write commands except for a first write command; assembling the plurality of write commands with data to a single write command, wherein the remote router assembles the plurality of write commands with data; and sending the single write command to the target.

14 Claims, 4 Drawing Sheets

```c
#define QL_COMPRESS_OPCODE_SMART_READ    0x88
#define QL_OPCODE_SMART_WRITE            0x8A
/*
 * CDB format to break I/Os.
 */
typedef struct_CDB_VUBU_IO
{
        UCHAR opcode;
        UCHAR flags;

#define CDB_SMART_WRITE_IO_LAST     0x01
#define CDB_SMART_WRITE_IO_FIRST 0x02
#define CDB_SMART_WRITE_IO_MIDDLE   0x04
#define CDB_SMART_WRITE_COMPRESS    0x08
        UCHAR cmdSeq;   /*sequence number to distinguish this fragment
                          from all other belonging to same I/O broken up by
    initiator bridge (and having same initiatorSeq)*/
        UCHAR totalCt;
        ULONG qlgc;
#define QLSC_QLGC_SIGNATURE    0x514C4743  /*'Q','L','G','C'*/
        ULONG initiatorSeq;  /* sequence number to distinguish this broken
                            I/O from others generated by same initiator */
        ULONG dataLength;  /*data length of this segment */
}CDB_VUBU_IO, *PCDB_VUBU_IO;
```
— 313

```c
/* Header aligned to 32 bytes */
typedef struct_qlSmartWriteHdr
{
        UCHAR Version;
#define QL_SMART_WRITE_HEADER_VERSION_1    0x01
        UCHAR CompressionAlgorithm;
#define QL_COMPRESS_ALGORITHM_NONE    0
#define QL_COMPRESS_ALGORITHM_HIFN    1
        UCHAR Compression Type;     // Algorithm specific
        UCHAR CdbLen;               // Original CDB length
        UCHAR Cdb[UTM_DEF_CDB_LEN];  // Original CDB
        ULONG OriginalDataLength;   // Total length of the original I/O
        ULONG CompressedLength;     // Length of compressed data
        UCHAR Reserved2[4];    // Align to 32 bytes
} QL_SMART_WRITE_HEADER, *PQL_SMART_WRITE_HEADER;
```
— 309

FIG. 3C

METHOD AND SYSTEM FOR WRITING NETWORK DATA

CROSS-REFERENCE TO RELATED APPLICATIONS

This application is a continuation of application Ser. No. 11/555,180, filed on Oct. 31, 2006, the entire contents of which are hereby incorporated by reference.

BACKGROUND

1. Field of the Invention

The present invention relates to networks, and more particularly, to writing network data.

2. Background of the Invention

Computer networks are commonly used. Storage area networks ("SANs") are a type of network used to store and access data. A SAN maintains a sub-network of shared storage devices, for example, disks and tape drives. A computer system (may also be referred to as a "host") can access data stored in the SAN.

Typical SAN architecture makes storage devices available to all servers that are connected using a computer network, for example, a local area network or a wide area network. The term server in this context means any computing system or device coupled to a network that manages network resources. For example, a file server is a computer and storage device dedicated to storing files. Any user on the network can store files on the server.

Conventional SAN systems have delay and latency when data is moved from one network location to another. The delay and latency becomes worse, if long distance (for example, 100 km) network connections are used to move data. Therefore, there is a need for a method and system to reduce the number of roundtrips to deliver data in network communication.

SUMMARY OF THE INVENTION

In one aspect of the present invention, a method for writing data in a network is provided. The method includes receiving an original write command from a host system to write data to a target; sending a command notifying the host system to send data, wherein a local router sends the command to the host system; receiving data from the host system, wherein the local router receives data; segmenting the original write command into a plurality of write commands; sending the plurality of write commands with data to a remote router; sending a status command to the local router for the plurality of write commands except for a first write command; assembling the plurality of write commands with data to a single write command, wherein the remote router assembles the plurality of write commands with data; sending the single write command to the target; sending data to the target after receiving a command from the target notifying the remote router that the target is ready to receive the data; and sending a status command to the local router, wherein the remote router sends the status command; and sending the status command to the host system, wherein the local router sends the status command.

In another aspect of the present invention, a network system is provided. The system includes a host system for sending an original write command to write data to a target; and a local router for sending a command to the host system notifying the host system that the target is ready to receive data and the hosts system sends the data to the local router; and the local router segments the original write command and data into a plurality of write commands and data; and sends the plurality of write commands and data to a remote router; wherein the remote router sends a status command to the local router for all the plurality of write commands except for a first write command; and the remote router assembles the plurality of write commands to a single write command and data and sends the single write command to the target and sends data to the target after receiving a command from the target notifying the remote router that the target is ready to receive data This brief summary has been provided so that the nature of the invention may be understood quickly. A more complete understanding of the invention can be obtained by reference to the following detailed description of the preferred embodiments thereof concerning the attached drawings.

BRIEF DESCRIPTION OF THE DRAWINGS

The foregoing features and other features of the present invention will now be described with reference to the drawings of a preferred embodiment. In the drawings, the same components have the same reference numerals. The illustrated embodiment is intended to illustrate, but not to limit the invention. The drawings include the following Figures:

FIG. 3C shows an example of a header format used according to one aspect of the present invention.

DETAILED DESCRIPTION

To facilitate an understanding of the preferred embodiment, the general architecture and operation of a SAN using storage devices will be described. The specific architecture and operation of the preferred embodiment will then be described with reference to the general architecture.

Before describing the general architecture, the following provides a brief introduction to various standard protocol/interface (for example, Fibre Channel, iSCSI and others) that may be used to move data in a SAN. Fibre Channel (incorporated herein by reference in its entirety) is an American National Standard Institute (ANSI) set of standards, which provides a serial transmission protocol for storage and network protocols such as HIPPI, SCSI (small computer system interface), IP, ATM and others. Fibre Channel provides an input/output interface for both channel and network users.

The iSCSI standard (incorporated herein by reference in its entirety) is based on Small Computer Systems Interface ("SCSI"), which enables a computer system to perform block data input/output ("I/O") operations with a variety of peripheral devices including disk and tape devices, optical storage devices, as well as printers and scanners. A traditional SCSI connection between a host system and a peripheral device is through parallel cabling and is limited by distance and device support constraints. For storage applications, iSCSI was developed to take advantage of network architectures based on Fibre Channel and Gigabit Ethernet standards.

iSCSI leverages the SCSI protocol over established networked infrastructures and defines the means for enabling block storage applications over TCP/IP networks. iSCSI defines mapping of the SCSI protocol with TCP/IP. The iSCSI standard includes an "immediate data" mode, which allows one to send command and data together.

The iSCSI architecture is based on a client/server model. Typically, the client is a host computing system such as a file server that issues a read or write command. The server may be a disk array that responds to the client request. Devices that request input/output ("I/O") processes are called initiators. Targets are devices that perform operations requested by initiators. Each target can accommodate up to a certain number of devices, known as logical units, and each is assigned a Logical Unit Number (LUN).

Figure 1:
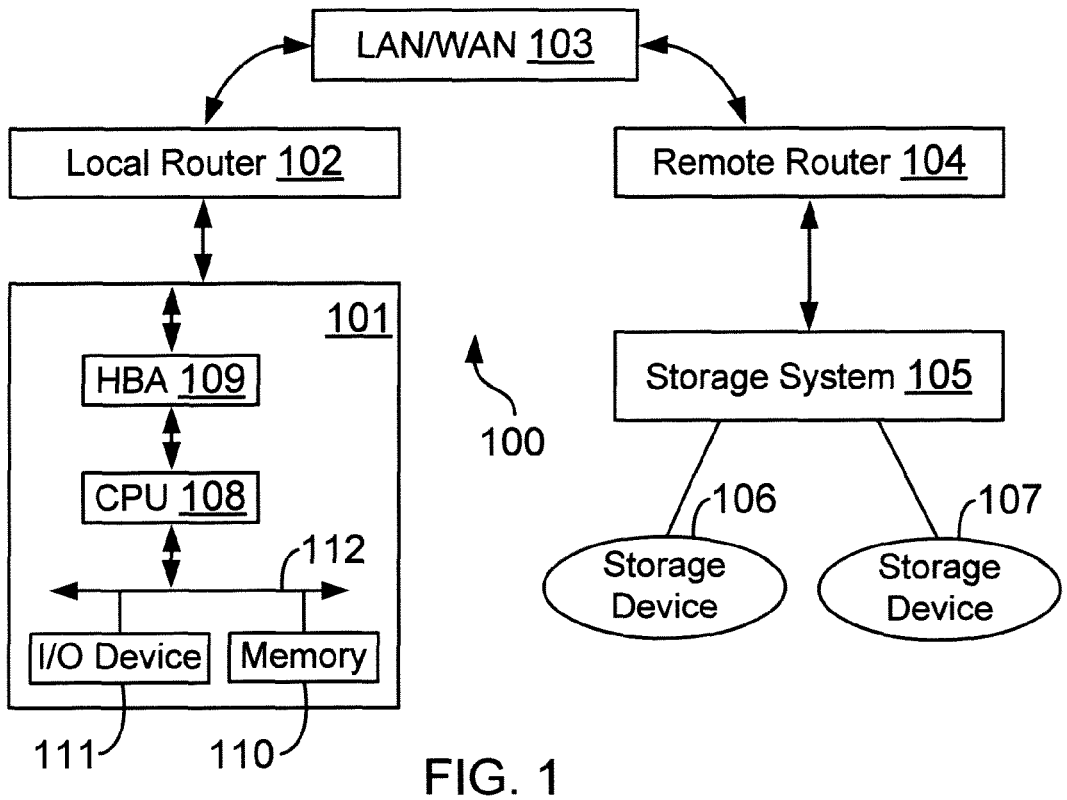
FIG. 1 shows a block diagram of a network topology, used according to one aspect of the present invention.

Network System:

FIG. 1 shows a top-level block diagram of a network system 100. Network system 100 includes a computing system (host) 101 that is coupled to a router 102 via host bus adapter (HBA) (or network interface) 109. Router 102 is labeled as a local router because it is geographically closer to host 101 than router 104 (labeled as remote router). Local router 102 is coupled to a local area network/wide area network 103, which is coupled to remote router 104.

Storage system 105 is coupled to remote router 104. Functionally, remote router 104 is a local router for storage system 105. Storage system 105 is operationally coupled to storage devices 106/107. Although only two storage devices have been shown, system 100 may include any number of storage devices. Furthermore, although only one host 101 and storage system 105 are shown, system 100 may include any number of hosts and storage systems.

Host system 101 typically includes several functional components. These components may include a central processing unit (CPU) 108, main memory 110, input/output ("I/O") devices 111, and HBA (may also be referred to as "network interface") 109. Main memory 110 is coupled to CPU 108 via a system bus 112 or a local memory bus (not shown). Main memory 110 is used to provide CPU 108 access to data and/or program information that is stored in main memory 110 at execution time. Typically, main memory 110 is composed of random access memory (RAM) circuits.

Read only memory (ROM, not shown) is provided to store invariant instruction sequences such as start-up instruction sequences or basic input/output operating system (BIOS) sequences.

Network interface 109 facilitates network communication between host 101 and other devices, for example, storage system 105. Network interface 109 includes hardware/software modules to handle such network communication.

Local router 102 and remote router 104 have hardware and software (firmware) to route network packets (or frames) between plural network devices.

Figure 2:
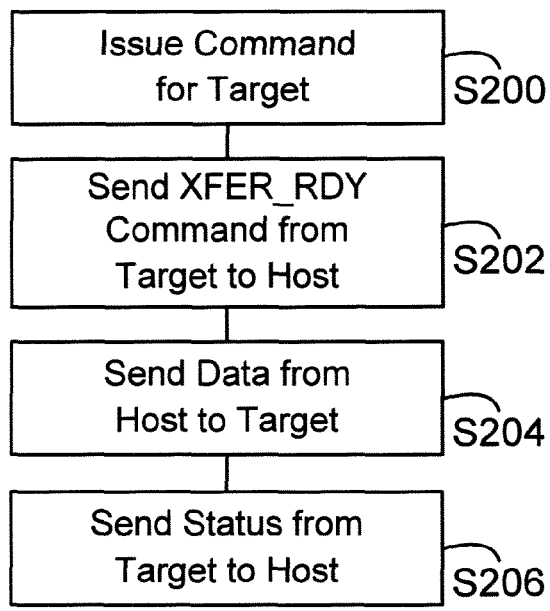
FIG. 2 is a process flow diagram for a conventional block storage write process.

FIG. 2 shows a flow chart of a conventional process for writing data to a target. The process starts in step S200, when an initiator (host 101) issues a write command to a target, for example, storage device 107.

In step S202, storage device 107 (via storage system 105, remote router 104, LAN/WAN 103 and local router 102) sends a response to host 101 notifying that it is ready to receive data. This response is a XFER_RDY command/primitive in a SCSI transfer.

After host 101 receives the XFER_RDY, in step S204, host 101 sends data to storage device 107.

In step S206, storage device 107 sends a status command to host 101.

The process of FIG. 2 has built in latency of at least two round trip delays before data write operation is complete, i.e. (1) A first round trip for sending the command; and receiving the XFER_RDY; and (2) A second round trip for sending the data and receiving the status. Short network connections may attempt to compromise with this number of roundtrips, but in long distance network connections, these round trips are undesirable.

The adaptive aspects of the present invention reduce the round trip delay to a single round trip regardless of data transfer size. The term round trip as used herein means, the trip from an initiator to a target and from a target to the initiator.

Figure 3A:
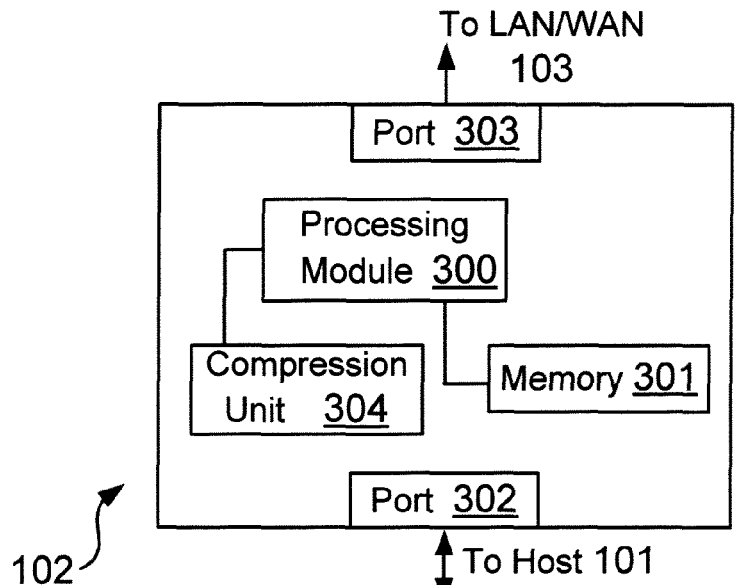
FIG. 3A is a block diagram of a router.

FIG. 3A shows a top-level block diagram of a router (102 or 104, operating as a local or remote router) used according to one aspect of the present invention. Local router 102 receives data and commands from a host application. Data and commands are segregated into plural write commands (may be referred to as "SmartWrite" commands). Remote router 104 receives the SmartWrite commands and data and assembles them into a single command and data as received by local router 102. The single command and data is then delivered to a target (107), in the same order it was received.

Router 102 includes a processor (also referred to as Processing Module) 300 with access to memory 301. Processor 300 executes firmware (software) instructions out of memory 301 to perform various router functions. Ports 302 and 303 support communication between host 101 and LAN/WAN 103, respectively. Router 102 also includes a compression unit 304 that is used to compress and de-compress data for achieving better throughput.

In one aspect, router 102 operates as a bridge between host 101 and storage system 105. Router 102 receives write commands (or a command data block (CDB) for a SCSI transaction) from host 101. Router 102 sends a XFER_RDY to host 101 instead of waiting for a target response. Host 101 sends data to router 102 and router 102 sends original write command and all the data with one or multiple SmartWrite commands to remote router 104. Remote router 104 responds with a status to all the write commands, except the first write command of this sequence.

Remote router 104 then assembles all the data and sends an original write command to the target. The target responds to the write command, and when target indicates it is ready to receive the data, remote router 104 sends the data. Upon receiving the status from a target, Remote router 104 also sends a status to local router 102. Thereafter, local router 102 sends a status command to host 101.

Figure 3B:
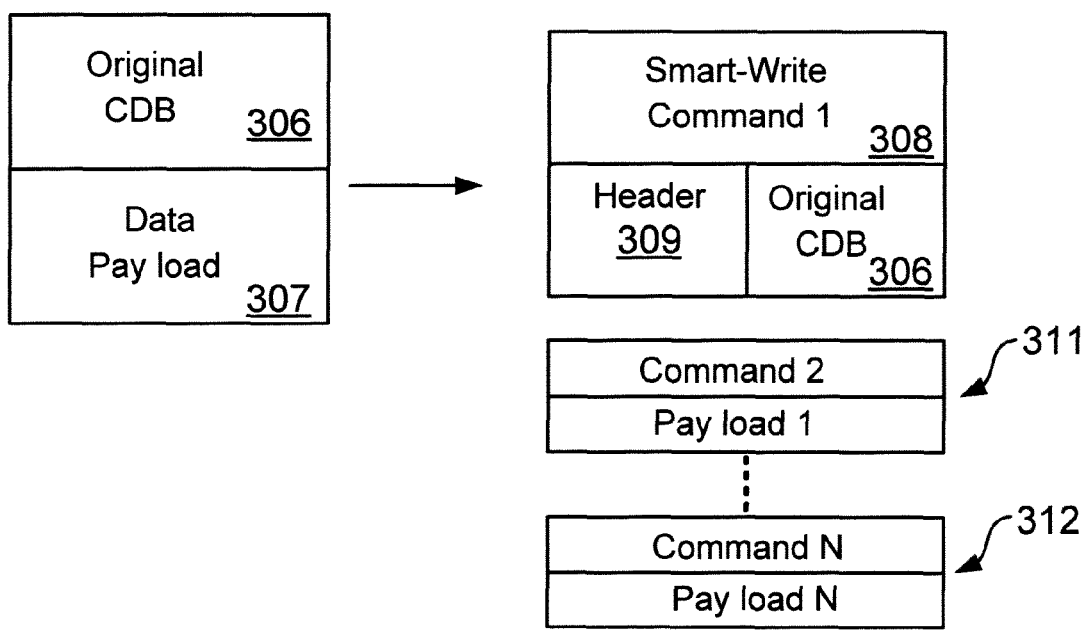
FIG. 3B shows an example of receiving an original write command and then splitting it into plural segments, according to one aspect of the present invention.

FIG. 3B shows an example of a CDB (called original CDB) 306 received from a host system. Data payload 307 accompanies CDB 306 using the "immediate data" feature provided by iSCSI. Router 102 breaks the original CDB into multiple SmartWrite commands. The first SmartWrite command is shown as 308 and includes a header 309 with the original CDB 306. The other commands and payload are shown as 311 and 312.

For example, if router 102 negotiates a data transfer size of 32 kb with router 104 and the actual write operation is for 128 kb, then the CDB/payload is split into 32 kb segments to meet the negotiated transfer size. When router 104 receives the 32 kb command/data payload segments, it reassembles the split CDB/payload before transferring it to the storage system/destination.

FIG. 3C shows an example of a SmartWrite header 309 and a CDB format 313 to break an original I/O request into plural segments. The CDB format 313 may be customized by a hardware vendor (for example, QLogic Corporation, the assignee of the present application) and includes plural flags/values. For example, format 313 includes a flag that indicates whether the CDB is compressed, whether the segment is the first segment, middle segment or the last segment. CDB format 313 also includes the "data length" of the segment. Format 313 allows a vendor to split original CDB 306 (FIG. 3B) into plural segments (308, 311 and 312, FIG. 3B).

Header 309 includes the original CDB length, original CDB, length of compressed data, if any, the type of compression algorithm that may have been used and other information. Compression/decompression is performed by compression unit 304 (FIG. 3A).

Figure 4:
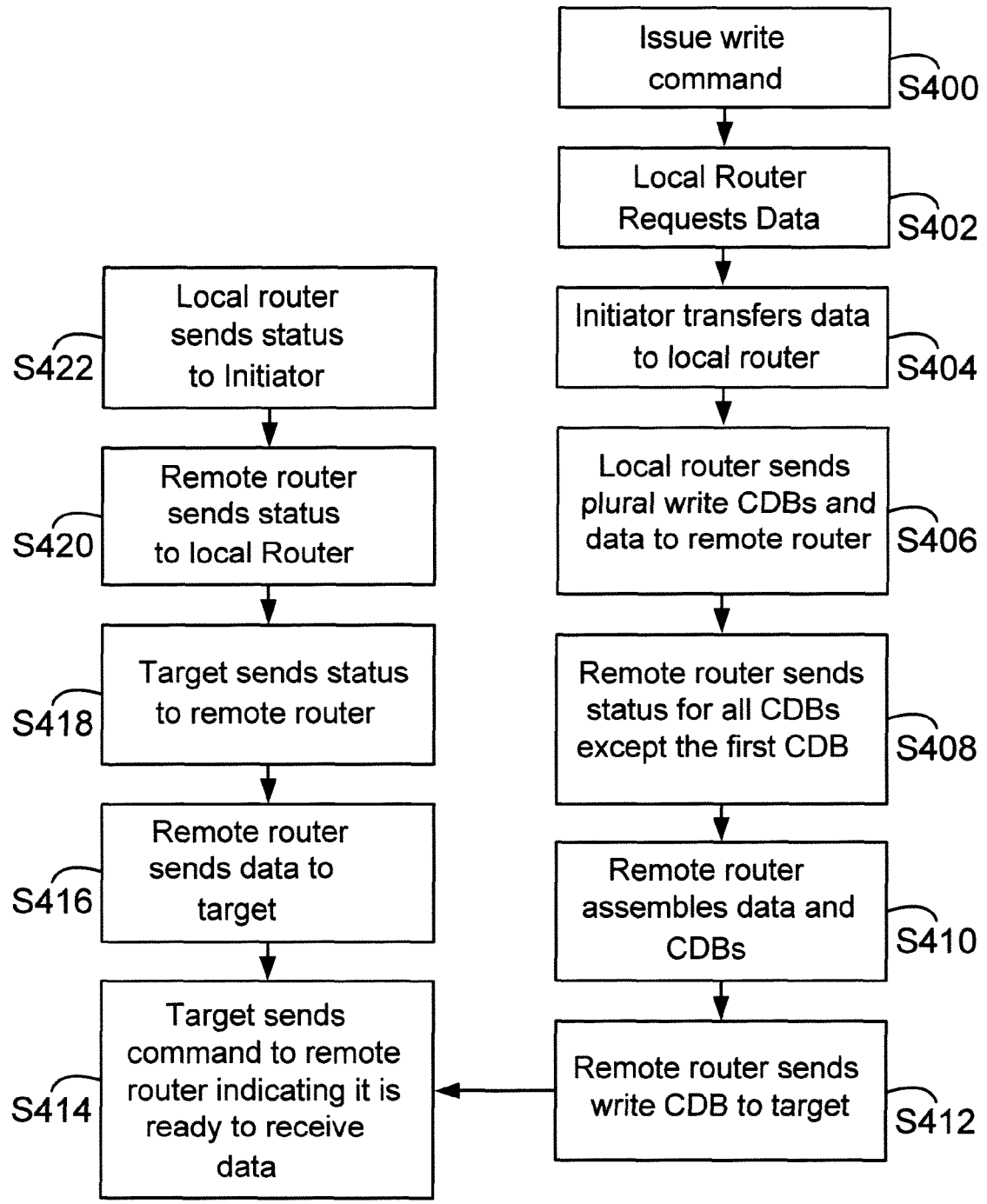
FIG. 4 is a process flow diagram for writing data, according to one aspect of the present invention.

FIG. 4 shows a process flow diagram for processing write commands, according to one aspect of the present invention. The process reduces the number of round trips to complete a write command, for example, to a single round trip.

Turning in detail to FIG. 4, in step S400, an initiator issues a write command (or write command block (CDB)). In this example, host 101 is an initiator that attempts to write to a target (storage device 107). Local router 102 receives the command (or ODE, used interchangeably).

In step S402, local router 102 sends a status/confirmation command/message to host 101 indicating that it is ready to receive data. For a SCSI based transfer, local router 102 sends the XFER_RDY primitive to host 101. Host 101 is not aware that local router 102 is sending the XFER_RDY command, instead of storage device 107. This is different from a conventional transaction, where the target device typically sends the XFER_RDY.

In step S404, host 101 transfers data to local router 102.

In step S406, local router 102 splits the original command/data into plural segments. Local router 102 uses SmartWrite commands similar to the example shown in FIG. 3B. The number of segments and the segment size will depend on a negotiated transfer size between local router 102 and remote router 104. Local router 102 sends plural write command blocks and data to remote router 104. Local router 102 uses the "immediate data" mode that allows host 101 to send data/command to router 102.

In step S408, remote router 104 sends status to local router 102 for all command blocks except for the first command block (308, FIG. 3B).

In step S410, remote router 104 assembles data and CDBs for delivery to target 107. In step S412, remote router 104 sends a write command to target 107. In step S414, target 107 sends a XFER_RDY primitive/command to remote router 104 indicating it is ready to receive data.

In step S416, remote router 104 sends assembled data to target 107. In step S418, remote target 107 sends status to remote router 104 and in step S420, remote router 104 sends status to local router 102. Thereafter, in step S422, local router 102 sends a status command to host 101.

In one aspect of the present invention, round trip delay for a write operation is minimized, for example, to a single round trip, instead of two/three round trips, regardless of the size of the data transfer. In another aspect, command and data are delivered in the same sequence as they are received by a local port (i.e. local router).

Although the present invention has been described with reference to specific embodiments, these embodiments are illustrative only and not limiting. Many other applications and embodiments of the present invention will be apparent in light of this disclosure and the following claims.

What is claim is:

1. A method for writing data in a network, the method comprising:
    a first router receiving an original command from a host system to write data to a target, wherein the command includes a header and an associated data payload having a size larger than a negotiated data transfer size;
    the first router breaking down the original command into a plurality of fractional commands, wherein each fractional command includes a copy of the header and a portion of the data payload that has a size equal to or less than the negotiated data transfer size;
    the first router sending the plurality of fractional commands to a second router;
    the second router receiving the plurality of fractional commands and reassembling them into the original command;
    the second router sending the original command to the target; and
    the second router sending a status command to the first router for the plurality of fractional commands, except for a first one of the fractional commands.

2. The method of claim 1, further comprising the second router sending the data payload to the target after receiving a command from the target notifying the second router that the target is ready to receive the data payload.

3. The method of claim 1, further comprising the first router sending a status command to the host system.

4. The method of claim 1, wherein the original command from the host system is a SCSI write command data block.

5. The method of claim 1, wherein data transfer occurs with single round trip delay.

6. The method of claim 1, wherein the host system communicates with the target via a network interface.

7. The method of claim 1, wherein the first and second routers each include a processor and at least two ports to support network communication.

8. A network system, comprising:
    a host system configured to send an original command to write data to a target, wherein the command includes a header and an associated data payload having a size larger than a negotiated data transfer size;
    a first router configured to receive the original command from the host system, break, down the original command into a plurality of fractional commands, wherein each fractional command includes a copy of the header and a portion of the data payload that has a size equal to or less than the negotiated data transfer size, and send the plurality of fractional commands; and
    a second router configured to receive the plurality of fractional commands, reassemble them into the original command, and send the original command to the target;
    wherein the second router is further configured to send a status command to the first router for the plurality of fractional commands, except for a first one of the fractional commands.

9. The network system of claim 8, wherein the second router is further configured to send the data payload to the target after receiving a command from the target notifying the second router that the target is ready to receive the data payload.

10. The network system of claim 8, wherein the first router is further configured to send a status command to the host system.

11. The network system of claim 8, wherein the original command from the host system is a SCSI write command data block.

12. The network system of claim 8, wherein data transfer occurs with single round trip delay.

13. The network system of claim 8, wherein the host system communicates with the target via a network interface.

14. The network system of claim 8, wherein the first and second routers each include a processor and at least two ports to support network communication.

\* \* \* \* \*

UNITED STATES PATENT AND TRADEMARK OFFICE
CERTIFICATE OF CORRECTION

PATENT NO. : 8,676,928 B1
APPLICATION NO. : 13/241012
DATED : March 18, 2014
INVENTOR(S) : Shishir Shah Page 1 of 1

It is certified that error appears in the above-identified patent and that said Letters Patent is hereby corrected as shown below:

In the Specification

In column 5, line 17, delete "ODE," and insert -- CDB, --, therefor.

Signed and Sealed this
First Day of July, 2014

Michelle K. Lee
*Deputy Director of the United States Patent and Trademark Office*